United States Patent Office 3,562,343
Patented Feb. 9, 1971

---

3,562,343
CATALYTIC ISOMERIZATION OF 2-PHENYLALKANES
Ronald L. Poe, Robert W. Wotring, Jr., and Claude D. Butler, Ponca City, Okla., assignors to Continental Oil Company, Ponca City, Okla., a corporation of Delaware
No Drawing. Filed Dec. 16, 1968, Ser. No. 784,228
Int. Cl. C07c *15/02, 5/28*
U.S. Cl. 260—668                                5 Claims

---

ABSTRACT OF THE DISCLOSURE

A 2-phenylalkane stream containing isomerization inhibitor impurities is contacted with gaseous HCl until the 2-phenylalkane stream is saturated with the gaseous HCl. The HCl saturated 2-phenylalkane stream is then heated in the presence of an aluminum chloride catalyst for a sufficient period of time until a substantial amount of the 2-phenylalkane has been isomerized to other isomers.

---

BACKGROUND OF THE INVENTION

Field of the invention

This invention relates to an isomerization process. In one aspect, the invention relates to the catalytic isomerization of 2-phenylalkanes containing isomerization inhibitor impurities. In a further aspect, the invention relates to an improvement in the production of alkylate for the manufacture of biodegradable detergents.

Brief description of the prior art

Straight-chain alkylbenzenes having from 10 to 18 carbon atoms in the alkyl chain are necessary in the preparation of the straight-chain alkylbenzene sulfonates which are well known and widely used biodegradable detergents. However, in the preparation of the intermediate alkylbenzenes, the various isomers of the alkylbenzenes are formed. Because the alkylbenzene sulfonates have better over all surface active properties when the phenyl group is not bonded to the carbon atom adjacent to the terminal carbon atom, means are constantly being sought whereby the 2-phenylalkanes so formed can be isomerized to the internal isomers, e.g., alkylbenzenes, wherein the benzene ring is bonded to the 3, 4, etc., carbon atom of the alkyl chain.

In the past, it has been customary to separate the 2-phenyl isomer and use the other isomers for production of heavy-duty detergents. Following this separation, there has been no economical and convenient means for isomerizing the 2-phenyl isomer to one of the more desirable isomers.

In recent years several methods have been advanced for the treatment of a 2-phenylalkane stream to produce a stream containing a reduced 2-phenylalkane content. Such methods generally employ the use of a promoter to aid in the isomerization of the 2-phenylalkanes to the other isomers in the presence of isomerization catalyst. However, in actual practice it is impractical to provide a distillation cut in which the 2-phenylalkane isomer does not contain impurities which severely hinder the isomerization of the 2-phenylalkanes. Because of the presence of these inhibiting impurities, the 2-phenylalkane isomer isomerizes very slowly with aluminum chloride catalyst promoted with a promoter, such as water, hydrogen chloride, and the like. The isomerization inhibitor impurities can be classified as multi-alkyl substituted aromatics and polynuclear aromatic compounds of the anthracene, naphthalene, and related types. Because these inhibitors are found to be concentrated in the highest boiling portion of the alkylate and the front end portions of the bottoms, it is very difficult and impractical to obtain a substantially pure 2-phenylalkane stream which does not contain these isomerization inhibitor impurities.

OBJECTS OF THE INVENTION

An object of the invention is to provide an improved process for isomerizing a hydrocarbon mixture containing a substantial amount of 2-phenylalkanes and isomerization inhibitor impurities. Another object of the invention is to provide an improved process for the catalytic isomerization of a 2-phenylalkane stream containing isomerization inhibitor impurities without the necessity of removing said impurities prior to the isomerizaton of the 2-phenylalkanes.

Other objects and advantages of the invention will be apparent to those skilled in the art upon a reading of this disclosure.

SUMMARY OF THE INVENTION

Broadly, the invention resides in a process for the treatment of a 2-phenylalkane stream containing isomerization inhibitor impurities to produce a stream containing reduced 2-phenylalkane content which comprises contacting said 2-phenylalkane stream with gaseous HCl until said 2-phenylalkane stream is saturated with said HCl, and heating said HCl saturated 2-phenylalkane stream to a temperature within the range of about 25 to 80° C. in the presence of aluminum chloride catalyst for a sufficient period of time until a substantial amount of the 2-phenylalkane has been isomerized to other isomers.

DESCRIPTION OF THE PREFERRED EMBODIMENTS

In the preparation of straight-chain alkylbenzenes having 8 to 18 carbon atoms in the alkyl chain which are necessary intermediates in the preparation of $C_8$ to $C_{18}$ straight-chain alkylbenzene sulfonates, which are widely used in biodegradable detergents, it is sometimes desired to make a product which has a low 2-phenylalkane content. Normally, this is achieved by removing a distillation cut rich in the 2-phenylalkane content isomer and then isomerizing the 2-phenylalkane isomer in the presence of aluminum chloride to the more internal isomers. However, because impurities are normally present in the 2-phenylalkane isomer-rich fraction, the isomerization of the 2-phenylakane isomer is severely hindered. These isomerization inhibitor impurities are multi-alkyl substituted aromatics and multi-ring aromatics, such as anthracene, naphthalene, and related types. We have now found that when isomerization inhibitor impurities are present in the 2-phenylalkane stream it is necessary to saturate the stream with gaseous HCl in order to provide an effective method for reducing the 2-phenylalkane content present in the stream.

After saturation of the 2-phenylalkane stream containing isomerization inhibitor impurities, the HCl saturated 2-phenylalkane stream is contacted with a sufficient amount of aluminum chloride catalyst at sufficient temperatures and pressures to allow the desired isomerization to take place. While the amount of aluminum chloride and the operation conditions, such as temperature and pressure, can be varied over a wide range, it is desirable to maintain a minimum amount of catalyst to prevent the formation of catalyst sludge which is discarded and must be separated from the isomerized product. We have found it advantageous to employ from about 1 to 12 weight percent aluminum chloride catalyst, based upon the weight of the 2-phenylalkane stream containing the isomerization inhibitor impurities and to carry out the isomerization at a temperature within the range of about 25 to about 80° C. Especially desirable results have been obtained wherein the isomerization reaction is carried out at a temperature within the range of about 40 to about 70° C. and the aluminum chloride catalyst is present in an amount of about 2 to 6 weight percent, based on the weight of said 2-phenylalkane stream. It will be evident to those skilled in the art that the rate of isomerization of the 2-phenylalkane isomers can readily be varied, depending upon the temperature and pressure at which the isomerization reaction is carried out and upon the amount of catalyst employed. However, it should be stressed that in order to provide an efficient method for the isomerization of the 2-phenylalkane isomer stream containing isomerization inhibitor impurities the amount of gaseous HCl employed must be an effective amount to saturate the 2-phenylalkane isomer stream, regardless of what operating conditions are chosen by the operator.

While the method of the present invention can be carried out by contacting the HCl saturated 2-phenylalkane stream containing isomerization inhibitor impurities with aluminum chloride catalyst at the conditions specified hereinabove, it is advantageous to the process to introduce an aryl compound to said 2-phenylalkane stream prior to saturating said stream with the gaseous HCl, as indicated in U.S. Pat. No. 3,352,933. When the aryl compound is employed, a sufficient amount of said aryl compound is utilized to provide a weight ratio of the 2-phenylalkane stream to the aryl compound of about 1:1 to 1:10. While any suitable aryl compound may be used in the practice of the present invention, the only restriction being that it be one which does not promote undesired reactions, especially desirable results have been obtained wherein the aryl compound is benzene and a weight ratio of 2-phenylalkane isomer stream to benzene of about 1:3 to 1:6 is maintained. However, as will be readily apparent to those skilled in this art, the rate of isomerization of 2-phenylalkane isomers will likewise vary, depending upon the benzene concentration.

Thus, the distinguishing feature of our invention resides in the HCl saturation of the 2-phenylalkane isomer stream prior to isomerization of the stream. As has been stressed, it is necessary that a sufficient amount of gaseous HCl be employed regardless of the particular operating conditions chosen in order to provide a saturated HCl stream.

The use of our invention does not substantially change the usual detergent production process. Our invention basically resides in a step following the production of the detergent alkylate, wherein the resulting stream is fractionated to produce a paraffin recycle stream which is returned to the chlorination reactor, as an alkylated product. The alkylated product is then fractionated, taking advantage of the difference in boiling points between the undesirable 2-phenyl isomer and the other alkyl benzene present to produce a low 2-phenyl heart cut alkylate overhead product and high 2-phenyl heavy alkylate mixture as the bottoms product. By employing the process of the invention it is not necessary to employ such careful distillation as to remove the isomerization inhibitor impurities from the stream containing the high 2-phenyl isomer content. The 2-phenyl isomer stream is then treated as hereinbefore described and isomerized in the presence of the aluminum chloride catalyst. In the isomerization, an equilibrium mixture of the various isomers is again produced, or at least approached, thus producing a stream containing the majority of the desired isomers which can then be sent to sulfonation and the 2-phenylalkane stream can be recycled to the isomerization reactor when desired.

In order to illustrate further the details of the process of this invention the following specific examples are given. These examples are presented primarily for the purpose of illustration and any enumeration or details contained therein are not to be interpreted as a limitation on the invention except as indicated in the appended claims. All parts referred to in these examples are parts by weight unless otherwise indicated.

Example 1

To determine the isomerization of a pure 2-phenylalkane isomer, 10 grams of pure 2-phenyltetradecane and 45 grams of benzene were admixed and heated to 65° C. To the resulting mixture was then added 0.5 gram of aluminum chloride. Hydrogen chloride gas was then bubbled into the solution for about 10 seconds, to result in a solution which was HCl-promoted but not saturated with HCl. The mixture was stirred and a sample was drawn at 5 minutes. GLPC analysis showed 26 percent 2-phenyltetradecane present. This is the equilibrium value for this isomer.

Example 2

A series of runs were conducted to determine the isomerization of a 2-phenylalkane isomer in the presence of isomerization inhibitor impurities. In a creased, round-bottomed flask were placed 10 grams of pure 2-phenyltetradecane, 45 grams of benzene, and 0.5 gram (0.0031 mole) hexamethylbenzene, an isomerization inhibitor impurity. Hydrogen chloride gas was bubbled into the solution for 10 seconds to promote the reaction. The flask was then placed in an oil bath at 65° C. and 1 gram (0.0075 mole) of aluminum chloride was added to the solution. Samples were withdrawn at intervals from the stirred reactor and analyzed by GLPC analyses to determine the amount of 2-phenyltetradecane present.

This procedure was then modified by saturating the reaction mixture with hydrogen chloride gas (0.004 gram per gram solution) before adding the aluminum chloride. Table I summarizes the results for both the hydrogen chloride promoted and the saturated hydrogen chloride gas procedures.

TABLE I

| | Percent 2-phenyl isomer | |
|---|---|---|
| | (HCl promotion) | (HCl saturation) |
| Time, minutes: | | |
| 0 | 100 | 100 |
| 5 | | 43 |
| 10 | | 31 |
| 20 | 92 | 28 |

The above data clearly indicates that by saturating the 2-phenylalkane solution containing isomerization inhibitor impurities with hydrogen chloride gas one effectively isomerizes the 2-phenyl isomer content present in the feed. This reduction is carried out in the presence of isomerization inhibitor impurities, whereas the feed stock which is merely treated with HCl wherein the HCl is used for promotion of the isomerization reaction had very little reduction in 2-phenyl isomer content.

Example 3

In order to determine the effect of hydrogen chloride concentration on the rate of 2-phenylalkane isomerization, a series of runs were conducted in which a 2-phenyltetradecane-rich fraction was isomerized in the presence of varying amounts of hydrogen chloride. The 2-phenyltetradecane-rich fraction was obtained by distilling 2-phenyl-rich bottoms, which in turn was obtained by distilling a sample of alklylate reaction product obtained by the aluminum chloride catalyzed alkllation of benzene with partially chlorinated (to about 20%) $C_{12}$ to $C_{14}$ normal paraffins.

In a 500-milliliter round-bottomed flask were placed 200 grams of benzene and 40 grams of the above 2-phenyltetradecane-rich distillation fraction containing 68.5 percent of the 2-phenyltetradecane. The flask was placed in a constant temperature oil bath at 65° C. Hydrogen chloride gas was bubbled into the solution through a fritted tube for 50 seconds. A small sample was withdrawn and titrated with a standard sodium hydroxide solution to determine the hydrogen chloride concentration. Then, 3.2 grams (8 weight percent based on the 2-phenyl fraction) aluminum chloride was added. Samples for GLPC analyses were withdrawn at intervals following addition of the aluminum chloride.

This procedure was repeated when the solution was saturated with hydrogen chloride gas prior to contacting same with the aluminum chloride. Table II gives the results of the analyses as follows:

TABLE II

| | Percent 2-phenyl isomer | |
|---|---|---|
| | HCl concentration (gm./gm. soln.) | |
| | 0.00079 | 0.00382 |
| Time, minutes: | | |
| 0 | 68.5 | 68.5 |
| 3 | 54.4 | 37.8 |
| 5 | 50.5 | 35.1 |
| 10 | 50.0 | 35.0 |
| 15 | 47.4 | 34.3 |
| 20 | 46.0 | 33.6 |
| 30 | 44.0 | 33.6 |

The above data further serves to illustrate, especially when viewed in conjunction with the preceding examples, that by saturating the 2-phenylalkane isomer stream containing isomerization inhibitor impurities with gaseous HCl prior to contacting the stream with aluminum chloride, the percent of 2-phenylalkane isomer is readily reduced. Further, it is evident to those skilled in the art that the rate of isomerization fo 2-phenylalkane will vary depending upon operating conditions such as temperature, catalyst concentration, benzene concentration, and hydrogen chloride concentration.

As many possible embodiments can be made of this invention without departing from the scope thereof, it is to be understood that all matter herein set forth is to be interpreted to be illustrative and not as unduly limiting the invention.

We claim:
1. A method for catalytic isomerization of a 2-phenylalkane stream containing isomerization inhibitor impurities to produce a stream containing reduced 2-phenylalkane content which comprises:
  (a) contacting said 2-phenylalkane stream with gaseous HCl until said 2-phenylalkane stream is saturated with said HCl; and
  (b) contacting said HCl saturated 2-phenylalkane stream with aluminum chloride catalyst and heating to a temperature within the range of about 25° C. to 80° C. for a sufficient period of time until a substantial amount of the 2-phenylalkane has been isomerized to other isomers.
2. The method according to claim 1 which includes introducing an aryl compound to said 2-phenylalkane stream prior to saturating said stream with gaseous HCl to provide a weight ratio of 2-phenylalkane stream to aryl compound to about 1:1 to 1:10.
3. The method according to claim 2 wherein said aryl compound is benzene and said ratio is about 1:3 to 1:6.
4. The method according to claim 3 wherein said HCl saturated 2-phenylalkane stream is heated to a temperature within the range of about 40° C. to 70° C. in the presence of from about 1 to 12 weight percent aluminum chloride catalyst.
5. The method according to claim 4 wherein said aluminum chloride catalyst is present in the amount of about 2 to 6 weight percent based on the weight of said 2-phenylalkane stream.

References Cited
UNITED STATES PATENTS

| 3,349,141 | 10/1967 | Sweeney. |
| 3,352,933 | 11/1967 | Sorgenti. |
| 3,358,047 | 12/1967 | Liston. |
| 3,391,210 | 7/1968 | Feighner et al. |

CURTIS R. DAVIS, Primary Examiner

U.S. Cl. X.R.
260—671